United States Patent [19]

Chao et al.

[11] 4,252,858
[45] Feb. 24, 1981

[54] COATED ARTICLE AND HOT MELT ADHESIVE COMPRISING FLUOROCARBON ELASTOMER ETHYLENE COPOLYMER AND TACKIFIER

[75] Inventors: Yuan Chao, Menlo Park; George Pieslak, Alameda, both of Calif.

[73] Assignee: Raychem Corporation, Menlo Park, Calif.

[21] Appl. No.: 85,020

[22] Filed: Oct. 15, 1979

Related U.S. Application Data

[62] Division of Ser. No. 882,391, Mar. 1, 1978, Pat. No. 4,197,380.

[51] Int. Cl.$^3$ .............................................. B32B 27/08
[52] U.S. Cl. .................................... 428/421; 428/422; 525/199
[58] Field of Search ................ 525/240, 199; 428/421, 428/422

[56] References Cited

U.S. PATENT DOCUMENTS

| 3,125,547 | 3/1964 | Blatz | 525/240 |
| 3,562,195 | 2/1971 | Reiner et al. | 260/23.5 |
| 3,582,518 | 6/1971 | Lyons | 260/41 |

Primary Examiner—Carman J. Seccuro
Attorney, Agent, or Firm—Lyon & Lyon

[57] ABSTRACT

Novel hot melt adhesive comprise a fluoroelastomer, an ethylene copolymer and a tackifier. Preferably the adhesive contains 20 to 40% by weight of the fluorocarbon elastomer, 40 to 60% by weight of the ethylene copolymer and 10 to 30% by weight of the tackifier. The adhesives will bond well to a wide variety of substrates, including substrates of low surface energy such as partially fluorinated polymers, even after prolonged exposure to high temperatures.

12 Claims, No Drawings

COATED ARTICLE AND HOT MELT ADHESIVE COMPRISING FLUOROCARBON ELASTOMER ETHYLENE COPOLYMER AND TACKIFIER

This is a division of application Ser. No. 882,391, filed Mar. 1, 1978, now U.S. Pat. No. 4,197,380.

BACKGROUND OF THE INVENTION

1. Field of the Invention

This invention relates to hot melt adhesives and to their use for bonding substrates together, especially substrates having low surface energies.

2. Summary of the Prior Art

Hot melt adhesives (also known as thermoplastic adhesives) are well known in the art and have valuable advantages in processing, storage and application. However, many of the known hot-melt adhesives will not bond well to materials having low critical surface energies, in particular fluorinated polymers, and/or are unstable (ie. they melt and flow and/or are chemically unstable) at the elevated temperatures (eg. above 100° C.) at which the use of such materials is often particularly valuable. Although the bondability of such materials can in some cases be improved by a surface treatment such as chemical etching, the need to carry out such a surface treatment is a disadvantage. Other known hot melt adhesives, which will bond well to substrates of low critical surface energy, suffer from other disadvantages. For example, one material which has been used as a hot melt adhesive is fluorinated ethylene/propylene coplymer (often know as FEP). Unfortunately, however, in order to provide good bond strength, FEP must be heated to a temperature of over 300° C., typically 315°–370° C., under a pressure which is typically 25–40 psi (1.75–2.8 kg/cm$^2$). It cannot, therefore, be used to bond substrates which melt or soften below such temperatures, eg. the fluorinated polymers. It has also been proposed to make hot melt adhesives based on ethylene/tetrafluoroethylene polymers, but these suffer from the same disadvantages as FEP copolymers. Hot melt adhesives based on mixtures of ethylene/vinyl acetate (EVA) copolymers and tackifiers are also known, but they do not bond well to materials which have low critical surface energies and/or which are non-polar, such as fluoropolymers; in addition their stability is poor at elevated temperatures eg. above 100° C., especially above 130° C., eg. at 150° C., so that the bond strength is seriously reduced by exposure to such temperatures. The same is true of hot melt adhesives based on polyesters, which have the additional disadvantage, when used for bonding electrical insulation, that their electrical insulation properties are poor, particularly under conditions of high humidity. Hot melt adhesives based on polysiloxane block copolymers have also been proposed, but they are expensive and not readily available.

Solvent-based adhesives containing fluoroelastomers have also been proposed, but do not have the ease of processing, storage and application of hot-melt adhesives, and also require the presence of a curing agent and use of a curing cycle after application.

SUMMARY OF THE INVENTION

We have now discovered a novel hot melt adhesive which will bond well to a wide variety of substrates (including a number of substrates for which known hot melt adhesives are unsatisfactory) even after prolonged exposure to elevated temperatures.

In its first aspect, the invention provides a hot melt adhesive composition which comprises (1) an ethylene copolymer containing polar groups;
(2) a fluorocarbon elastomer; and
(3) a tackifier.

In its second aspect, the invention provides a bonded assembly comprising two substrates which are bonded together through a layer of a hot melt adhesive as defined above.

In its third aspect the invention provides a process for making a bonded assembly which comprises pressing two substrates against a layer of a hot melt adhesive as defined above, which layer lies between the substrates and is at a temperature above its activation temperature, and maintaining pressure between the substrates while the hot melt adhesive cools to below its activation temperature. Generally the hot melt adhesive will be placed between the substrates while it is solid, either as a self-supporting preform of any desired shape or as a layer adherent to one of the substrates, and the assembly will then be heated, while pressing the substrates towards each other, to heat the hot melt adhesive above its activation temperature.

The excellent bonding powers of the novel hot melt adhesives are most surprising in view of the fact that the fluoroelastomers alone are poor adhesives and the fact that known hot melt adhesives based on EVA/tackifier mixtures will not provide satisfactory bonds to low surface energy substrates, and are unstable at elevated temperatures.

DETAILED DESCRIPTION OF THE INVENTION

The percentages of the ethylene copolymer (1), the fluoroelastomer (2) and the tackifier (3) which are generally, preferably, and most preferably used, are as set out below, the percentages being by weight based on the total weight of the three specified components.

|  | Ethylene Copolymer(1) | Fluoroelastomer(2) | Tackifier (3) |
| --- | --- | --- | --- |
| Generally used | 10–90% | 5–60% | 5–40% |
| Preferably used | 30–80% | 10–50% | 5–40% |
| Most preferably used | 40–60% | 20–40% | 10–30% |

The ethylene copolymer (1) is preferably a crystalline copolymer containing at least 50 mole %, preferably at least 60 mole %, especially at least 65 mole % of units derived from ethylene, and at least 5 mole %, preferably 10 to 40 mole %, especially 15 to 35 mole %, particularly 15 to 25 mole %, of units which contain at least one polar group, which units may be obtained by copolymerising at least one unsaturated comonomer containing at least one polar group and/or by modification, eg. by partial or complete hydrolysis, of units derived from at least one such comonomer. The comonomer preferably contains a terminal ethylenic double bond. Preferred polar groups are carboxyl groups and carboxylic ester groups, including both pendant carboxylic ester groups, derived for example from alkyl esters of unsaturated carboxylic acids, and pendant alkyl carbonyloxy groups, derived for example from vinyl esters of saturated carboxylic acids. Other polar groups include cyano groups and hydroxyl groups, which may be obtained for example by hydrolysis of copolymers containing units derived from vinyl esters. Particularly suitable monomers include vinyl esters of saturated carboxylic acids containing 1 to 4 carbon atoms, especially vinyl acetate; acrylic and methacrylic acids; and alkyl (including cycloalkyl) and aryl esters, especially methyl esters, of acrylic and methacrylic acids, said esters preferably containing at most 10 carbon atoms, especially methyl methacrylate, methyl acrylate and ethyl acrylate.

The copolymer may contain units in addition to those derived from ethylene and those containing polar groups, but the amount of such additional units is preferably less than 20 mole %, particularly less 10 mole %, especially substantially zero.

Particularly preferred as the copolymer (1) is a copolymer of ethylene and vinyl acetate and 0 to 10 mole % of another comonomer, preferably a polar comonomer. Such copolymers are referred to herein as EVA copolymers. The vinyl acetate content in such copolymers is preferably 20 to 30 mole %. For some purposes an EVA copolymer having a melt index of not more than 10, eg. 1.5 to 7.5, is preferred. It is also often preferred that the EVA copolymer have a tensile strength of at least 2000 psi (140 kg/cm$^2$).

Suitable commercially available ethylene copolymers include the copolymers of ethylene and ethyl acrylate with a small proportion of methacrylic acid which are sold by Union Carbide as DPD 6169 and DPD 6181, and the 72:28 copolymers of ethylene and vinyl acetate which are sold by du Pont as Elvax 4260 and 260.

The fluorocarbon elastomer (2) is preferably a polymer of one or more fluorinated monomers containing ethylenic unsaturation and optionally one or more other compounds containing ethylenic unsaturation. The fluorinated monomer may be a perfluorinated monoolefin, for example hexafluoropropylene or tetrafluoroethylene, or a partially fluorinated monoolefin which may contain other substituents, eg. chlorine or perfluoroalkoxy, for example vinylidene fluoride, chlorotrifluoroethylene and perfluoroalkyl vinyl ethers in which the alkyl group contains up to six carbon atoms, eg. perfluoro (methyl vinyl ether); the mono-olefin is preferably a straight or branched chain compound having a terminal ethylenic double bond and containing less than six carbon atoms, especially two or three carbon atoms. The elastomer preferably consists of units derived from fluorine-containing monomers. When units derived from other monomers are present, the amount thereof is preferably less than 30 mole %, generally less than 15 mole %; such other monomers include, for example, olefins containing less than six carbon atoms and having a terminal ethylenic double bond, especially ethylene and propylene. The elastomer will preferably consist of carbon, hydrogen, fluorine and oxygen atoms.

Preferred elastomers are copolymers of vinylidene fluoride and at least one other fluorinated monomer, especially one or more of hexafluoropropylene, tetrafluoroethylene and chlorotrifluoroethylene, the vinylidene fluoride content preferably being 30 to 70 mole %. Commercially available fluoroelastomers of this class include copolymers of vinylidene fluoride and hexafluoropropylene such as Viton A, Viton A35 and Viton AHV sold by du Pont; copolymers of vinylidene fluoride, hexafluoropropylene and tetrafluoroethylene such as Viton B and Viton B50 sold by du Pont; and copolymers of vinylidene fluoride and chlorotrifluoroethylene such as Kel-F sold by Minnesota Mining and Manufacturing Co. The Mooney viscosity of the elastomer at 100° C. is generally 20 to 200, preferably 30 to 160.

The term "tackifier" is used in adhesive art to denote a material which when added to an adhesive composition promotes its adhesion to a substrate, by increasing its ability to wet the substrate. Many tackifiers are known. We prefer to use low molecular weight polymers of monomers which contain ethylenic unsaturation and are free of polar groups, for example polymers of one or more compounds of the formula

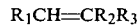

$$R_1CH=CR_2R_3$$

wherein each of $R_1$, $R_2$ and $R_3$, which may be the same or different, is a substituted or unsubstituted alkyl (including cycloalkyl), alkenyl (including cycloalkenyl), aryl, aralkyl or alkaryl radical containing less than ten carbon atoms. Suitable such tackifiers include Nevpene 9500, which is believed to be a copolymer of a mixture of aromatically and alphatically substituted ethylenes, and Piccotex 75, which is believed to be a copolymer of vinyl toluene and α methylstyrene. Other tackifiers which can be used include terpene-phenolic resins (eg. Nevillac Hard). The tackifiers used preferably have at least one of the following properties Brookfield Viscosity at 160°: 80–1500 centipoises
Ball-and-Ring Softening point: 50°–130° C.
Molecular Weight: <3000

As previously indicated, the adhesives of the present invention will bond to a wide variety of substrates, including a number of substrates, especially the fluoropolymers described below, to which many known hot melt adhesives provide bonds which are greatly inferior, especially after exposure to elevated temperatures. Thus adhesives of the present invention will bond well to materials having critical surface energies above 30 dynes/cm, and even to materials which have lower surface energies, for example as low as 25 dynes/cm, and which are fluoropolymers containing at most 65% by weight of fluorine. Suitable substrates include many organic polymers, for example polyarylenes, eg. "Stilan", polyamides, eg. nylons, polyimides, eg. "Kapton", polyamide-imides, eg. "Torlon", polyethylene and other polyolefins, polyphenylene sulphide, eg. Ryton, and metals, for example aluminum and copper. The adhesives are especially useful for bonding fluoropolymers which are homopolymers of partially fluorinated olefins, copolymers of at least one partially fluorinated or perfluorinated olefin and at least one olefin, and copolymers of at least one partially fluorinated olefin and at least one perfluorinated olefin, which fluoropolymers may contain 0 to 15 mole % of units derived from other comonomers, particularly polyvinylidene fluoride (eg. "Kynar"), ethylene/tetrafluorethylene copolymers (eg. "Tefzel") and ethylene/chlorotrifluoroethylene copolymers (eg. "Halar"). The materials which are bonded together can of course be the same or different, and one or both of them can be a polymer which has been cross-linked, eg. by irradiation. One or both of the substrates to be bonded together can be heat-recoverable; for example a heat-shrinkable sleeve or cap can be provided with a coating of the adhesive, to provide an article which can be shrunk onto a substrate while simultaneously or subsequently activating the adhesive. The adhesives of the invention are particularly useful for bonding together insulating components of electrical systems, for example the insulating jacket of a flat cable to the body portion of a connector for the cable.

In addition to the above-mentioned three basic components, the adhesive may contain additives designed to improve specific aspects of its performance, such as thermooxidative stability and stiffness. Thus, for example, antioxidants such as butylated hydroxytoluene (BHT), Santowhite (4,4'-thiobis(6-t-butyl-m-cresol)), Irganox 1093 (an organic antioxidant manufactured by Geigy), and Ferroant (an oligomeric phenolic antioxidant manufactured by Raychem) may be used, either individually or in combination. The modulus of the adhesive can be increased with fillers such as silica, glass fibers and glass bubbles. Reagents for crosslinking the fluoroelastomer and/or the ethylene copolymer, such as a peroxide or an alkaline earth metal oxide and a diamine or its derivative, may be included in the adhesive so that when it is exposed to elevated temperatures, crosslinking will occur and the adhesives will acquire further high temperature strength. It will be apparent to those skilled in the art that these and other common additives such as pigments and stabilizers against ultra violet light may be used singly or in combination.

The ingredients of the adhesive can be mixed together by conventional mixing techniques, for example as described in the Examples below.

The adhesive preferably has a softening point, as determined by Thermomechanical analysis (TMA), of 60° to 100° C., preferably 65° to 90° C. When, as is preferred, the adhesive is used as a preform (which may be in the form of a layer on one of the substrates) it is preferably shaped at a temperature which is at least 40° C. above its softening point but is not of course so high as to damage the substrate, generally below 250° C., preferably 150° to 200° C. When the adhesive is being used to bond two substrates together, it is preferably heated to a temperature of 150° to 220° C., especially 200°-220° C.; above 220° C. there is a tendency for bubbles to form. This temperature need be maintained for a relatively short time, eg. 10 to 30 seconds. The pressure between the substrates during the bonding process is generally 5 to 25 psi (0.35 to 1.75 kg/cm$^2$), preferably not more than 20 psi (1.4 kg/cm$^2$). When using substrates which are not too thick, it is convenient to subject an assembly of the substrates and the adhesive preform to heat and pressure by means of a press having heated platens.

The invention is illustrated by the following examples in which parts are by weight and temperatures are in degrees Centigrade, except where stated otherwise.

In each of the Examples the adhesive was prepared in a Brabender Plasti-corder. The mixing chamber was preheated to 210°, and the fluoroelastomer was introduced, followed by the ethylene copolymer one minute later and the tackifier portionwise four minutes later. Throughout the blending process the temperature was maintained at 210° and the speed of the mixing screws at 25-45 rpm. When the mixture had been rendered homogeneous it was removed and pressed into slabs 10 mil (0.0025 cm) thick in a press having platens coated with poly(tetrafluoroethylene), the pressing being for 30 seconds at 200° C. and 15,000 psi (1050 kg/cm$^2$). Test specimens 3×1 inch (7.5×2.5 cm) were cut from the slabs and bonded to specimens of the various substrates by placing the adhesive test specimen in contact with the substrate for 10 to 50 seconds at 200° to 250° under a pressure of about 20 psi (1.4 kg/cm$^2$). After heat aging in a dry air circulating oven as specified, the adhesive strength was measured either as a 90° or 180° peel value at a peel rate of 10 inches/minute (25 cm/minute) with an Instron tester.

The various ingredients of the adhesives which are identified by their trade names in the Examples below are believed to be materials as further identified below DPD 6169: A copolymer of ethylene and ethyl acrylate (molar ratio 82:18) having a Melt Index of about 6

Viton A35: A copolymer of vinylidene fluoride and hexafluoropropylene (molar ratio 60:40) having a Mooney viscosity at 100° C. of 35±5)

Piccotex 75: A copolymer of vinyl toluene and α methyl styrene having a melting point of about 75° C.

Elvax 4260: A copolymer of ethylene, methacrylic acid and vinyl acetate (28 mole %) having a Melt Index of about 6.

Elvax 265: A copolymer of ethylene and vinyl acetate (molar ratio 72:28) having a Melt Index of about 6.

Elvax 360: A copolymer of ethylene and vinyl acetate (molar ratio about 75:25) having a Melt Index of 1.6 to 2.4.

Viton AHV: A copolymer of vinylidene fluoride and hexfluoropropylene (molar ratio 60:40) having a Mooney Viscosity at 100° C. of about 160.

The Kynar and Tetzel materials used as substrates in the tests of the adhesives had been cross-linked by irradiation, thus giving them sufficient stability for use in the heat-aging tests.

EXAMPLE I

An adhesive blend (hereafter referred to as Adhesive I) comprising 40 parts Viton A-35, 40 parts DPD 6169, and 20 parts Piccotex 75 was prepared. Its bonding properties to a variety of substrates after heat aging for up to 1000 hours at 150° are given in Table I. As can be seen, outstanding peel strength is retained even to the conclusion of the test. In fact, samples which have been exposed to some heat develop a bond that is stronger than the initial one.

EXAMPLE II

A mixture (designated Adhesive II) comprising 50 parts Elvax 4260, 30 parts Viton A35 and 20 parts Piccotex 75 was prepared and tested as in Example I. The results are given in Table II. Again, the outstanding bond strength after 1000 hours aging at 150° is apparent.

Similar but more viscous adhesives were prepared by using Elvax 265 or a mixture of Elvax 4260 (20 parts) and Elvax 360 (30 parts) in place of the Elvax 4260, and Viton AHV in place of the Viton A35.

EXAMPLE III

Adhesive blends comprising Viton A35, DPD 6169 and Piccotex 75 were prepared. The tackifier concentration was 20% throughout, but the Viton and DPD 6169 concentrations were varied. Table III shows the effect of varying the Viton concentration on the strength of the bond formed between Tefzel and Kynar. The table shows that the addition of Viton helps adhesion and that maximum improvement occurs at about 30% Viton.

In the 90° peel tests used to evaluate these adhesives the elasticity of the adhesive plays an important role in determining bond strength. An elastic adhesive can deform at the peel junction, thus absorbing much of the stress that would otherwise be transmitted to the adhesive bond. Thus, the Viton performs the dual function of rendering the adhesive elastically deformable and thermooxidatively stable.

EXAMPLE IV

Adhesive blends comprising Viton A35, DPD 6169, and Piccotex 75 were prepared in which the Viton to DPD 6169 ratio was kept constant while the Piccotex percentage was varied. Table IV shows the effect of varying the tackifier concentration on the strength of the bond formed between Kynar and Tefzel surfaces, and demonstrates that optimal performance is achieved at a 20% loading of tackifier.

EXAMPLE V

Adhesive blends of 40–50% Elvax 4260, 20 to 30% Viton A35 and 20% Piccotex 75 were filled with 5 to 20% glass fibers. The effect of varying the glass fiber loading on the mechanical properties of the blends and on the strength of the bond formed between Stilan and Kynar materials is shown in Table V. Fiber reinforcement of the adhesives to give substantially stiffer material without sacrificing adhesion is possible, and is valuable for situations which require a more rigid adhesive than the unfilled blends.

EXAMPLE VI

To demonstrate the importance of a fluoroelastomer in rendering the adhesive more thermooxidatively stable, a blend of 80% DPD 6169 and 20% Piccotex 75 was prepared and used to bond Stilan to Kynar and Tefzel to Tefzel. The bonded assemblies were then heat aged at 150° C. The results, provided in Table VI, show that the adhesives without Viton do not heat age as well. In addition to the numerical data of Table VI, visual inspection of the samples after aging shows that the adhesive is much more brittle than a comparable sample containing Viton.

EXAMPLE VII

Example VI was repeated except that a blend of 80% Elvax 4260 and 20% Piccotex 75 was used. The results are given in Table VII.

TABLE I

Testing of Adhesive I

| Substrates | Hrs Aged at 150° | 90° Peel Strength lb/in Width | Mode of Failure |
|---|---|---|---|
| Kynar-Tefzel | 0 | 6 to 10 | Adhesive-Tefzel |
| Kynar-Tefzel | 100 | 21.1 | Adhesive-Kynar |
| Kynar-Tefzel | 250 | 33.7 | Mixed |
| Kynar-Tefzel | 500 | 19.6 | Adhesive-Kynar |
| Kynar-Tefzel | 750 | 19.5 | Adhesive-Kynar |
| Kynar-Tefzel | 1000 | 22.6 | Adhesive-Kynar |
| Kynar-Stilan | 0 | 5.9 | Adhesive-Kynar |
| Kynar-Stilan | 100 | 1.3 | Adhesive-Stilan |
| Kynar-Stilan | 250 | 1.7 | Adhesive-Stilan |
| Kynar-Stilan | 500 | 3.5 | Adhesive-Stilan |
| Kynar-Stilan | 750 | 15.4 | Adhesive-Stilan |
| Kynar-Stilan | 1000 | 10.9 | Adhesive-Stilan |
| Tefzel-Ryton | 0 | 8[b] | Adhesive-Tefzel |
| Tefzel-Rayon | 250 | 30[b] | Mixed |
| Tefzel-Rayon | 500 | 35[b] | Mixed |
| Tefzel-Torlon | 0 | 6[b] | Adhesive-Tefzel |
| Tefzel-Torlon | 250 | 15[b] | Mixed |
| Tefzel-Torlon | 500 | 28[b] | Adhesive-Tefzel |

[b]180° peel

TABLE II

Testing of Adhesive II

| Substrates | Hrs Aged at 150° | 90° Peel Strength lb/in Width | Mode of Failure |
|---|---|---|---|
| Tefzel-Kynar | 0 | 6.6 | Adhesive-Kynar |
| Tefzel-Kynar | 100 | 26 | Adhesive-Kynar |
| Tefzel-Kynar | 250 | 26 | Mixed |
| Tefzel-Kynar | 500 | 28 | Mixed |
| Tefzel-Kynar | 750 | 28 | Mixed |
| Tefzel-Kynar | 1000 | 24 | Mixed |
| Kynar-Stilan | 0 | 5.8 | Adhesive-Stilan |
| Kynar-Stilan | 100 | 10.3 | Adhesive-Stilan |
| Kynar-Stilan | 250 | 10.4 | Adhesive-Stilan |
| Kynar-Stilan | 500 | 12.7 | Adhesive-Stilan |
| Kynar-Stilan | 750 | 11.5 | Adhesive-Stilan |
| Kynar-Stilan | 1000 | 11.7 | Adhesive-Stilan |
| Tefzel-Ryton | 0 | 6.22[2] | Adhesive-Tefzel |
| Tefzel-Ryton | 250 | 20[2] | Mixed |
| Tefzel-Ryton | 500 | 26[2] | Mixed |
| Tefzel-Torlon | 0 | 5.6[2] | Adhesive-Tefzel |
| Tefzel-Torlon | 250 | 8.6[2] | Mixed |
| Tefzel-Torlon | 500 | 23.6[2] | Adhesive-Tefzel |

[2]180° Peel

TABLE III

Effect of Varying Viton Concentration on Bond Strength

| Percent Viton A35 | Bond Strength, lb/in |
|---|---|
| 0 | 5.0 |
| 10 | 6.7 |
| 20 | 7.0 |
| 30 | 8.4 |
| 40 | 7.4 |
| 50 | 3.7 |

TABLE IV

Effect of Piccotex 75 Concentration on Bond Strength

| Percent Piccotex 75 | T-peel, lb/in |
|---|---|
| 0 | 2 |
| 10 | 5.6 |
| 20 | 6.6 |
| 30 | 5.6 |

TABLE V

The Effect of Glass Fibers on Adhesion

| % Glass Fibers | Substrates | 90° Peel Strength lb/in (width) pli | Young's Modulus (psi) |
|---|---|---|---|
| 0 | Stilan-Kynar | 5.1 | 350 |
| 5 | Stilan-Kynar | 6.1 | 1075 |
| 10 | Stilan-Kynar | 6.4 | 5444 |
| 15 | Stilan-Kynar | 5.4 | 5615 |
| 20 | Stilan-Kynar | 6.3 | 12042 |

TABLE VI

Heat Aging of a Blend Comprising 80% DPD 6169 and 20% Piccotex 75

| Substrates | Hrs at 150° | 90° Peel, lb/in | Mode of Failure |
|---|---|---|---|
| Stilan-Kynar | 250 | 5.5 | Mixed |
|  | 500 | 1.9 | Adhesive-Stilan |
|  | 750 | 1.7 | Adhesive-Stilan |
|  | 1000 | 0.8 | Adhesive-Stilan |
| Tefzel-Tefzel | 0 | 10.0 | Adhesive |
|  | 100 | 16.6 | Adhesive |
|  | 250 | 11.7 | Cohesive |
|  | 500 | 5.2 | Cohesive |
|  | 750 | 5.0 | Adhesive |
|  | 1000 | 4.5 | Adhesive |

TABLE VII

Heat Aging of a Blend Comprising 80% Elvax 4260 and 20% Piccotex 75

| Substrates[a] | Hrs at 150° | 90° Peel, lb/in | Mode of Failure |
|---|---|---|---|
| Stilan-Stilan | 0 | 2 | Adhesive |
|  | 100 | 4.3 | Adhesive |
|  | 250 | 4.1 | Adhesive |
|  | 500 | 4.2 | Adhesive |
|  | 750 | 6.0 | Adhesive |
|  | 1000 | 5.2 | Adhesive |
| Tefzel-Tefzel | 0 | 11.5 | Adhesive |
|  | 100 | 17.5 | Adhesive |
|  | 250 | 10.0 | Adhesive |
|  | 500 | 6.8 | Adhesive |
|  | 750 | 3.5 | Adhesive |
|  | 1000 | 4.0 | Adhesive |

We claim:

1. A heat-recoverable article comprising a heat-recoverable substrate having a coating on at least part of the surface thereof in the direction of heat-recovery of a hot melt adhesive which comprises
   (1) 10 to 90% by weight of a crystalline ethylene copolymer comprising at least 50 mole % of units derived from ethylene and at least 5 mole % of units derived from at least one unsaturated comonomer containing at least one polar group;
   (2) 5 to 60% by weight of a fluorocarbon elastomer consisting of at least one or more fluorinated monomers containing ethylene unsaturation and from 0 to 30 mole % other ethylenically unsaturated monomers; and
   (3) 5 to 40% by weight of a tackifier,
all percentages by weight being based on the total weight of the three compounds.

2. A heat-recoverable article according to claim 1 wherein said substrate is composed of a heat-shrinkable cross-linked organic polymer.

3. A heat-recoverable article according to claim 2 wherein said substrate is composed of a polymer selected from the group consisting of polymers of at least one partially fluorinated olefin, copolymers of at least one partially fluorinated olefin and at least one olefin, copolymers of at least one perfluorinated olefin and at least one olefin, and copolymers of at least one partially fluorinated olefin and at least one perfluorinated olefin.

4. A bonded assembly comprising a first substrate, a second substrate and a layer of a hot melt adhesive which lies between said first and second substrates and bonds them together, said hot melt adhesive comprising
   (1) 10 to 90% by weight of a crystalline ethylene copolymer comprising at least 50 mole % of units derived from ethylene and at least 5 mole % of units derived from at least one unsaturated comonomer containing at least one polar group;
   (2) 5 to 60% by weight of a fluorocarbon elastomer consisting of one or more fluorinated monomers to 70 mole % of units derived from containing ethylenic unsaturation and from 0 to 30 mole % other ethylenically unsaturated monomers; and
   (3) 5 to 40% by weight of a tackifier,
all percentages by weight being based on the total weight of the three compounds.

5. A bonded assembly according to claim 4 wherein said first substrate (a) surrounds said second substrate; (b) is composed of a cross-linked organic polymer; and (c) has been heat-shrunk around said second substrate.

6. A bonded assembly according to claim 4 wherein at least one of said substrates is an insulating component of an electrical system.

7. A heat-recoverable article according to claim 1 wherein the hot-melt adhesive comprises 30 to 80% by weight of an ethylene copolymer.

8. A heat-recoverable article according to claim 1 in which the ethylene copolymer comprises at least 16 mole % of units derived from ethylene and 10 to 40 mole % of units derived from at least unsaturated comonomer containing at least one polar group.

9. A heat-recoverable article according to claim 6 or 7 in which the hot-melt adhesive comprises from 10 to 50% of a fluorocarbon elastomer.

10. A bonded assembly according to claim 4 wherein the ethylene copolymer comprises at least 60 mole % of units derived from ethylene and 10 to 40 mole % of units derived from at least one unsaturated comonomer containing at least one polar group.

11. A bonded assembly according to claim 4 or 10 in which the fluorocarbon elastomer comprises 30 to 70 mole % of units derived from vinylidene fluoride and 70 to 30 mole % of units derived from a comonomer selected from hexafluoropropylene, tetrafluoroethylene and chlorotrifluoroethylene.

12. A bonded assembly according to claim 11 wherein at least one of said substrates is composed of a polymer selected from the group consisting of polymers of at least one partially fluorinated olefin, copolymers of at least one partially fluorinated olefin and at least one olefin, copolymers of at least one perfluorinated olefin and at least one olefin, and copolymers of at least one partially fluorinated olefin and at least one perfluorinated olefin.

* * * * *